United States Patent
Yang

(10) Patent No.: US 9,719,606 B1
(45) Date of Patent: Aug. 1, 2017

(54) VACUUM BREAKER VALVE

(71) Applicant: Tsai-Chen Yang, Taichung (TW)

(72) Inventor: Tsai-Chen Yang, Taichung (TW)

( * ) Notice: Subject to any disclaimer, the term of this patent is extended or adjusted under 35 U.S.C. 154(b) by 0 days.

(21) Appl. No.: 15/097,901

(22) Filed: Apr. 13, 2016

(51) Int. Cl.
  E03C 1/10 (2006.01)
  F16K 24/02 (2006.01)
  E03B 7/12 (2006.01)

(52) U.S. Cl.
  CPC .......... *F16K 24/02* (2013.01); *E03B 7/12* (2013.01); *Y10T 137/314* (2015.04); *Y10T 137/3331* (2015.04)

(58) Field of Classification Search
  CPC ........ E03B 7/12; F16K 24/02; Y10T 137/314; Y10T 137/3331
  See application file for complete search history.

(56) References Cited

U.S. PATENT DOCUMENTS

| | | | | |
|---|---|---|---|---|
| 7,458,388 B2* | 12/2008 | Huang | ...................... | E03B 7/10 137/107 |
| 8,360,105 B2* | 1/2013 | Cashen | .................. | F16K 24/06 137/526 |
| 8,701,222 B2* | 4/2014 | Shin | ......................... | E03D 9/08 4/420.4 |
| 2005/0178434 A1* | 8/2005 | Yang | ...................... | F16K 24/06 137/218 |
| 2013/0341918 A1* | 12/2013 | Yeh | .......................... | E03B 7/12 285/355 |
| 2015/0000771 A1* | 1/2015 | Chuang | ................... | F16L 29/00 137/535 |

\* cited by examiner

*Primary Examiner* — Craig Schneider
*Assistant Examiner* — Kevin Barss
(74) *Attorney, Agent, or Firm* — Muncy, Geissler, Olds & Lowe, P.C.

(57) ABSTRACT

A vacuum breaker valve is provided, including: a barrel member, a biasing assembly, a water stop gasket and a plate. The biasing assembly is abutted within the barrel member. The water stop gasket is disposed in the barrel member and abuts against the biasing assembly. The water stop gasket has a water stop portion which is deformable to close at least one air passage of the barrel member. The plate is located between the inlet end and the water stop gasket, and its engaging flange structure is blockable, in a direction toward the inlet end, by a shoulder portion of the barrel member. The biasing assembly normally drives the water stop portion of the water stop gasket apart from the at least one air passage to keep the at least one air passage non-closed.

10 Claims, 4 Drawing Sheets

VACUUM BREAKER VALVE

BACKGROUND OF THE INVENTION

Field of the Invention

The present invention relates to a water valve, and more particularly to a vacuum breaker valve.

Description of the Prior Art

Generally, a vacuum breaker valve guides air into a pipe after water stops being discharged out from the pipe in order to discharge extra water out.

However, in this type of prior arts, a plate in the vacuum breaker valve is put therein directly or abuts against an inner wall of a barrel member, so the plate may fall off easily and influence the operation of other elements.

The present invention has arisen to mitigate and/or obviate the afore-described disadvantages.

SUMMARY OF THE INVENTION

The major object of the present invention is to provide a vacuum breaker valve, which has a plate for other elements to be abutted thereagainst or positioned thereon so that the elements will not fall off easily.

To achieve the above and other objects, a vacuum breaker valve is provided, including: a barrel member, including an inlet end, an outlet end and at least one air passage communicating with the outlet end, an inner wall of the barrel member having a shoulder portion; a biasing assembly, abutting against the barrel member; a water stop gasket, having at least one water flowing hole, the water stop gasket disposed in the barrel member and abutting against the biasing assembly, a circumference of the water stop gasket having a water stop portion which is deformable, the water stop portion corresponding to the at least one air passage; a plate, located between the inlet end and the water stop gasket, having at least one through hole communicating with the inlet end, a circumference of the plate protruding radially outward to form an engaging flange structure and having a material-reduced structure near the engaging flange structure, the material-reduced structure allowing the engaging flange structure to elastically deform to be received in the barrel member so that the engaging flange structure is blockable, in a direction toward the inlet end, by the shoulder portion; wherein the biasing assembly normally drives the water stop portion of the water stop gasket apart from the at least one air passage to keep the at least one air passage non-closed.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
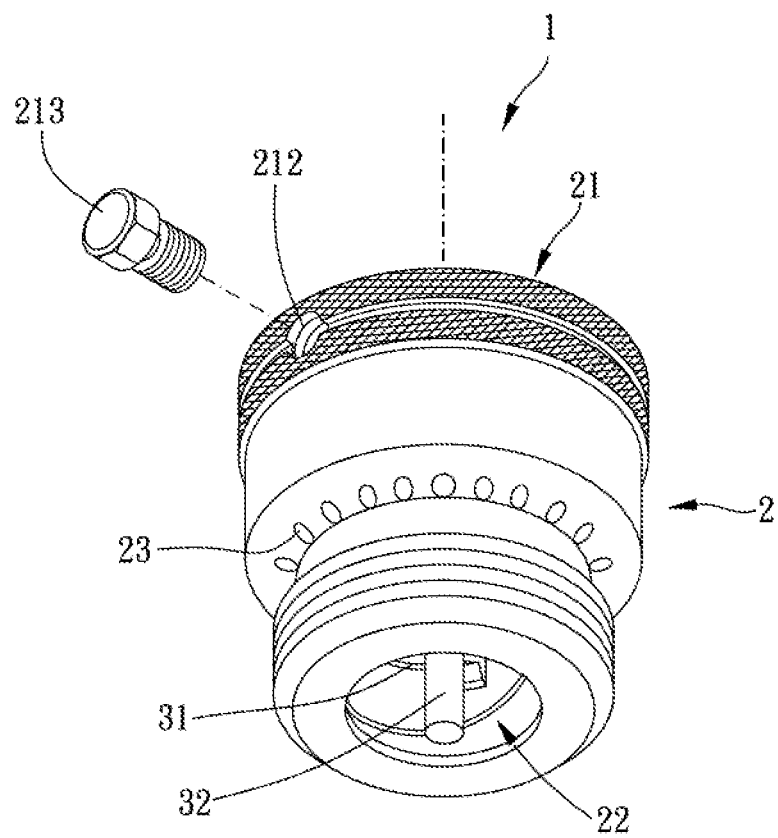
FIG. 1 is a perspective view of a preferred embodiment of the present invention.
Figure 2:
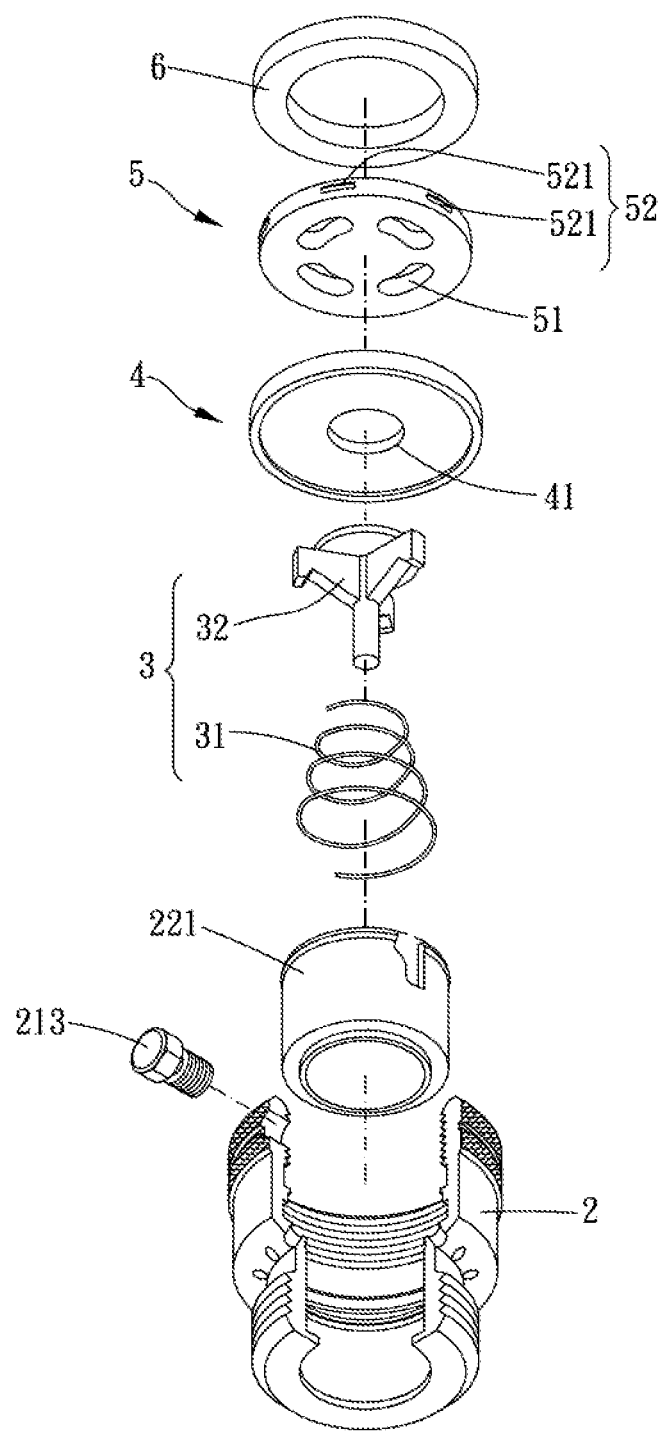
FIG. 2 is a breakdown view of the preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A vacuum breaker valve 1 includes a barrel member 2, a biasing assembly 3, a water stop gasket 4 and a plate 5.

The barrel member 2 includes an inlet end 21, an outlet end 22 and at least one air passage 23 communicating with the outlet end 22, and an inner wall of the barrel member 2 has a shoulder portion 24. A biasing assembly 3 abuts against the barrel member 2. A water stop gasket 4 has at least one water flowing hole 41, the water stop gasket 4 is disposed in the barrel member 2 and abuts against the biasing assembly 3, a circumference of the water stop gasket 4 has a water stop portion 42 which is deformable, and the water stop portion 42 corresponds to the at least one air passage 23. A plate 5 is located between the inlet end 21 and the water stop gasket 4 and has at least one through hole 51 communicating with the inlet end 21, the through hole 51 can increase a water pressure, a circumference of the plate 5 protrudes radially outward to form an engaging flange structure 52 and has a material-reduced structure 53 near the engaging flange structure 52, and the material-reduced structure 53 allows the engaging flange structure 52 to elastically deform to be received in the barrel member 2 so that the engaging flange structure 52 is blockable, in a direction toward the inlet end 21, by the shoulder portion 24. When the biasing assembly 3 normally drives the water stop portion 42 of the water stop gasket 4 apart from the at least one air passage 23 to keep the at least one air passage 23 non-closed, air can enter through a pipe connected to the outlet end 22 to release a vacuum state, and fluid in the pipe can be discharged out.

In this embodiment, the material-reduced structure 53 is an annular groove. the outlet end 22 further includes a blocking flange 222 and a non-metal sleeve 221, the non-metal sleeve 221 abuts against the blocking flange 222. Preferably, the non-metal sleeve 221 may include an engaging flange structure 52a to be fixedly engaged with the barrel member 2 (as shown FIG. 5), and the biasing assembly 3 includes an elastic member 31 abutting against the non-metal sleeve 221 and a restriction member 32 abutting against and between the water stop gasket 4 and the elastic member 31. The inner wall of the barrel member 2 further has an annular recess 25, two opposite sides of the circumference of the water stop gasket 4 respectively project axially to form an annular rib 43, the two annular ribs 43 are engaged within the annular recess 25 to position the water stop gasket 4, the water stop gasket 4 further includes a pad 44 connected between the two annular ribs 43, and the pad 44 is driven by the biasing assembly 3 to flatly contact a bottom surface of the plate 5 normally. The engaging flange structure 52 of the plate 5 includes a plurality of engaging flanges 521 circumferentially arranged therearound in intervals so as to make the plate 5 be positioned in the barrel member 2 stably. The shoulder portion 24 annularly protrudes on the inner wall of the barrel member 2, and the inner wall of the barrel member 2 is further annularly provided with an annular protrusion 26 located between the shoulder portion 24 and the plate 5 (may be a part of a thread). The vacuum breaker valve 1 further includes a gasket 6 engaged between the shoulder portion 24 and the annular protrusion 26, and the gasket 6 can prevent the fluid from leaking from the inlet end 21 when a pipe is connected to the inlet end 21.

In this embodiment, an inner circumference of the inlet end 21 has an annular chamfer 211. The annular chamfer 211 enables the water stop gasket 4 and the gasket 6 to deform and be put into the barrel member 2 as well as makes a pipe be engaged with the inlet end 21 smoothly. An inner surface of the inlet end 21 is non-threaded and has a threaded hole 212 penetrating therethrough, and a screw member 213 is screwed through the threaded hole 212 and adjustably disposed into an interior of the inlet end 21. After a pipe is screwed to the inlet end 21, the screw member 213 can stabilize an engagement of the pipe and the vacuum breaker valve 1.

When the water stop gasket 4 receives a force, the water stop portion 42 abuts against the non-metal sleeve 221 so that a space defined between the water stop portion 42 and the non-metal sleeve 221 is isolated from the inner wall of the barrel member 2. When the barrel member 2 is made of metal, the barrel member 2 can prevent the fluid from contacting the barrel member 2 or containing heavy metal.

Figure 3:
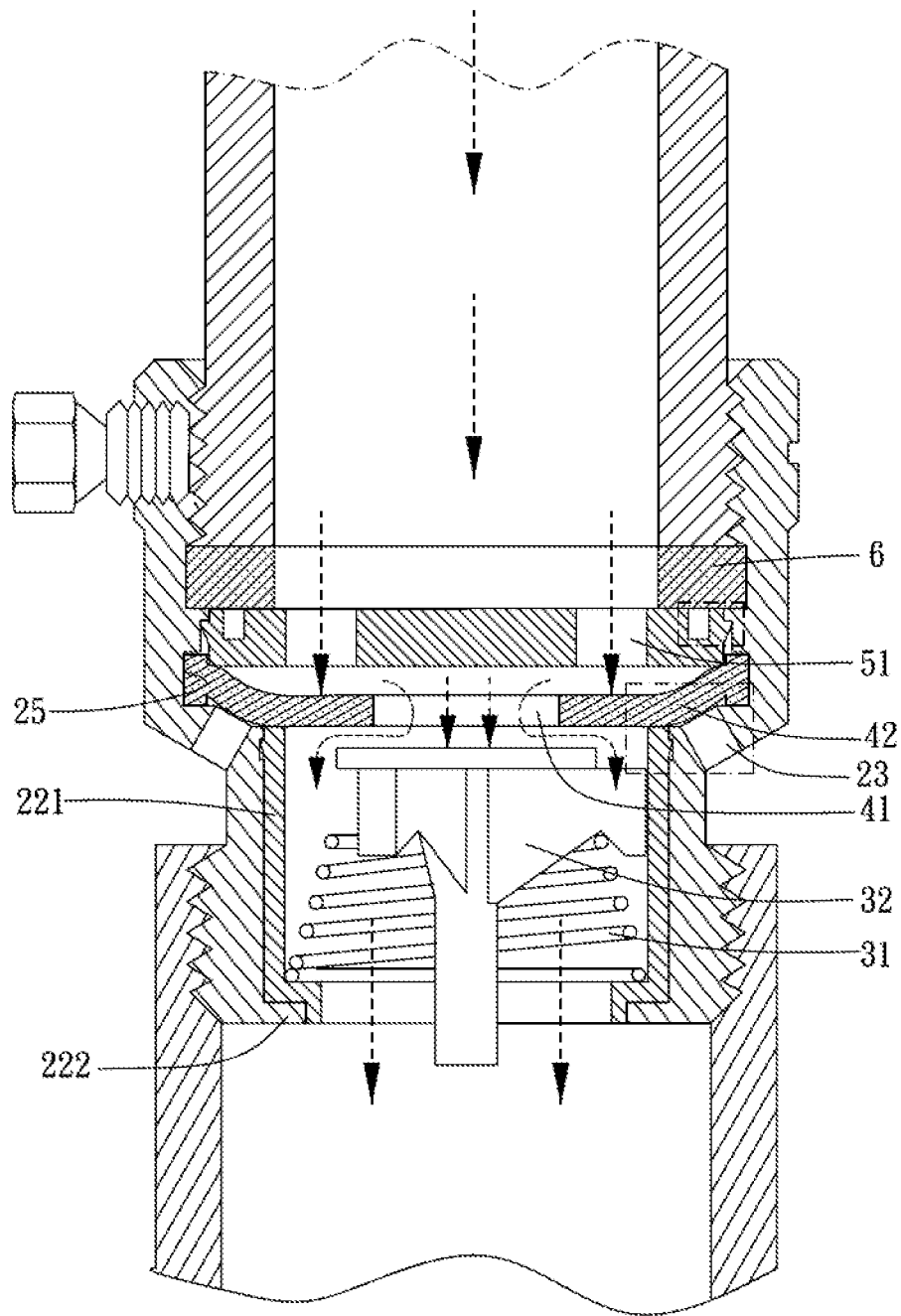
FIGS. 3 and 4 are drawings showing the preferred embodiment of the present invention in operation.
Figure 4:
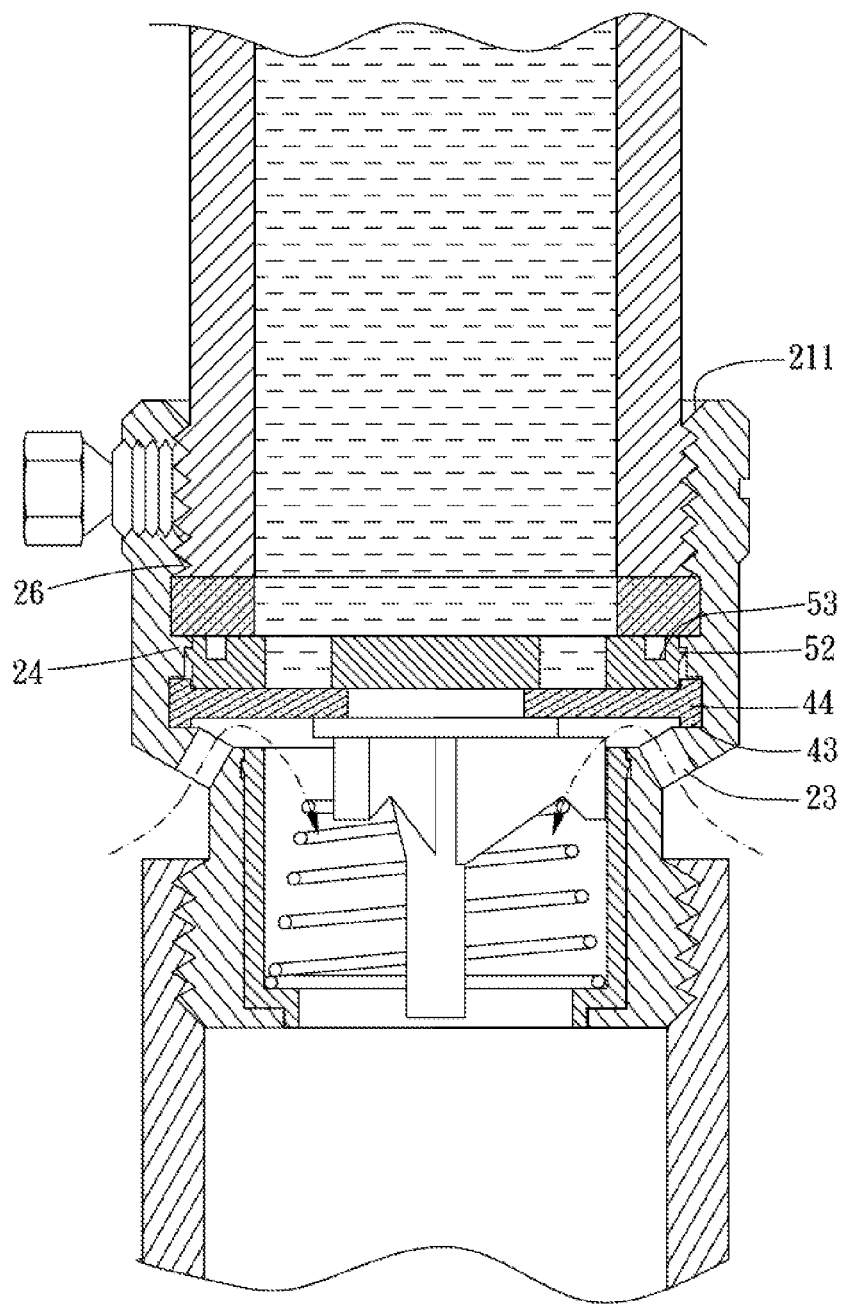
Figure 5:
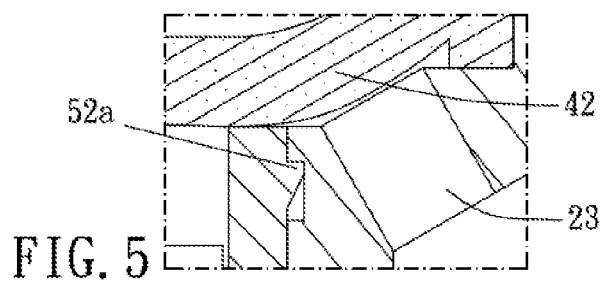
FIGS. 5 and 6 are partially-enlarged views of FIG. 3.
Figure 6:
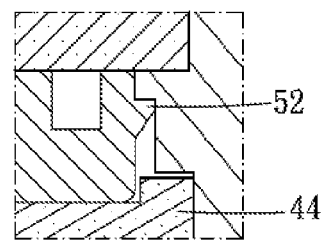

Please refer to FIGS. 3 to 5, in actual use, the fluid flows through the through hole 51 of the plate and presses the water stop gasket 4 to drive the biasing assembly 3 to move toward the outlet end 22, so the water step portion 42 abuts against the non-metal sleeve 21 and covers the air passages 23, and the fluid can flow out of the outlet end 22 smoothly. After the pipe is closed, the biasing assembly 3 moves toward the inlet end 22 and pushes the water stop gasket 4 to make the restriction member 32 abut against the water flowing hole 41 and make the water stop portion 42 apart from the air passages 23. Therefore, the air passages 23 can guide air in and make the fluid in the pipe which is connected to the outlet end 22 to be discharged out smoothly.

In other embodiment, two faces of the material-reduced structure of the plate may be in a curved or dented mode; or a center of the material-reduced structure of the plate may be thinner than a circumference thereof. The annular rib of the water stop gasket may respectively extend axially and be curved. The inner surface of the inlet end is non-threaded and has the threaded hole penetrating therethrough, and the screw member is screwed through the threaded hole and adjustably disposed into an interior of the inlet end to stabilize the engagement of the pipe and the vacuum breaker valve. The barrel member of the vacuum breaker valve may be a non-metal structure, and the barrel member may not include the non-metal sleeve. The engaging flange structure of the plate may be a structure which is annular and continuous.

Given the above, the plate of the vacuum breaker valve has the engaging flange structure which is stable; therefore, the water stop gasket and the biasing assembly can be precisely positioned in the barrel member, the plate can be prevented from falling off and causing the water stop gasket and the biasing assembly to fall off during operation.

While we have shown and described various embodiments in accordance with the present invention, it should be clear to those skilled in the art that further embodiments may be made without departing from the scope of the present invention.

What is claimed is:

1. A vacuum breaker valve, including:
   a barrel member, including an inlet end, an outlet end and at least one air passage communicating with the outlet end, an inner wall of the barrel member having a shoulder portion;
   a biasing assembly, abutting against the barrel member;
   a water stop gasket, having at least one water flowing hole, the water stop gasket disposed in the barrel member and abutting against the biasing assembly, a circumference of the water stop gasket having a water stop portion which is deformable, the water stop portion corresponding to the at least one air passage;
   a plate, located between the inlet end and the water stop gasket, having at least one through hole communicating with the inlet end, a circumference of the plate protruding radially outward to form an engaging flange structure and having a material-reduced structure near the engaging flange structure, the material-reduced structure allowing the engaging flange structure to elastically deform to be received in the barrel member so that the engaging flange structure is blockable, in a direction toward the inlet end, by the shoulder portion;
   wherein the biasing assembly normally drives the water stop portion of the water stop gasket apart from the at least one air passage to keep the at least one air passage non-closed.

2. The vacuum breaker valve of claim 1, wherein the shoulder portion annularly protrudes on the inner wall of the barrel member.

3. The vacuum breaker valve of claim 1, wherein the material-reduced structure is a groove.

4. The vacuum breaker valve of claim 1, wherein the biasing assembly includes an elastic member abutting against the barrel member and a restriction member abutting against and between the water stop gasket and the elastic member.

5. The vacuum breaker valve of claim 1, wherein the inner wall of the barrel member further has an annular recess, two opposite sides of the circumference of the water stop gasket respectively project axially to form an annular rib, and the two annular ribs are engaged within the annular recess.

6. The vacuum breaker valve of claim 1, wherein the inner wall of the barrel member further has an annular protrusion located between the shoulder portion and the plate, and the vacuum breaker valve further includes a gasket engaged between the shoulder portion and the annular protrusion.

7. The vacuum breaker valve of claim 1, wherein an inner circumference of the inlet end has an annular chamfer.

8. The vacuum breaker valve of claim 1, wherein an inner surface of the inlet end is non-threaded and has a threaded hole penetrating therethrough, and a screw member is screwed through the threaded hole and adjustably disposed into an interior of the inlet end.

9. The vacuum breaker valve of claim 1, wherein the outlet end further includes a non-metal sleeve, when the water stop gasket receives a force, the water stop portion abuts against the non-metal sleeve so that a space defined between the water stop portion and the non-metal sleeve is isolated from the inner wall of the barrel member.

10. The vacuum breaker valve of claim 2, wherein the material-reduced structure is an annular groove; the outlet end further includes a blocking flange, the outlet end further includes a non-metal sleeve, the non-metal sleeve abuts against the blocking flange, the biasing assembly includes an elastic member abutting against the non-metal sleeve and a restriction member abutting against and between the water stop gasket and the elastic member; the inner wall of the barrel member further has an annular recess, two opposite sides of the circumference of the water stop gasket respectively project axially to form an annular rib, the water stop gasket further includes a pad connected between the two annular ribs, the two annular ribs are engaged within the annular recess; the inner wall of the barrel member further has an annular protrusion, the vacuum breaker valve further includes a gasket engaged between the shoulder portion and the annular protrusion; an inner circumference of the inlet end has an annular chamfer; an inner surface of the inlet end is non-threaded and has a threaded hole penetrating therethrough, a screw member is screwed through the threaded hole and adjustably disposed into an interior of the inlet end; when the water stop gasket receives a force, the water stop portion abuts against the non-metal sleeve so that the space defined between the water stop portion and the non-metal sleeve is isolated from the inner wall of the barrel member; and the pad of the water stop gasket is driven by the biasing assembly to flatly contact a bottom surface of the plate normally.

\* \* \* \* \*